Aug. 9, 1949.  R. R. WILLIS ET AL  2,478,883
PORTABLE CRATE HAVING SLIDING PIVOTED CLOSURE
Filed June 1, 1948

INVENTOR.
RALPH R. WILLIS
LOUIS L. BAYERS
BY
Baldwin Vale
ATTORNEY

Patented Aug. 9, 1949

2,478,883

UNITED STATES PATENT OFFICE 2,478,883

PORTABLE CRATE HAVING SLIDING PIVOTED CLOSURE

Ralph R. Willis and Louis L. Bayers, Oakland, Calif.

Application June 1, 1948, Serial No. 30,428

3 Claims. (Cl. 220—38)

This invention relates to portable crates and more particularly to means for shipping small domestic animals.

Among the objects of the invention is the provision of means for safely and comfortably expressing show animals such as dogs, cats, birds and the like.

Another object is to protect the animal from possible injury within the structure of the crate.

A further object is the provision of a simple, safe and effective gate for controlling the entrance, release and feeding of the animal.

Other objects and advantages will appear as the description proceeds. In the specification and the accompanying drawings the invention is disclosed in its preferred form. But it is to be understood that it is not limited to this form because it may be embodied in modifications within the spirit of the invention as defined in the claims following the description.

Figure 1:
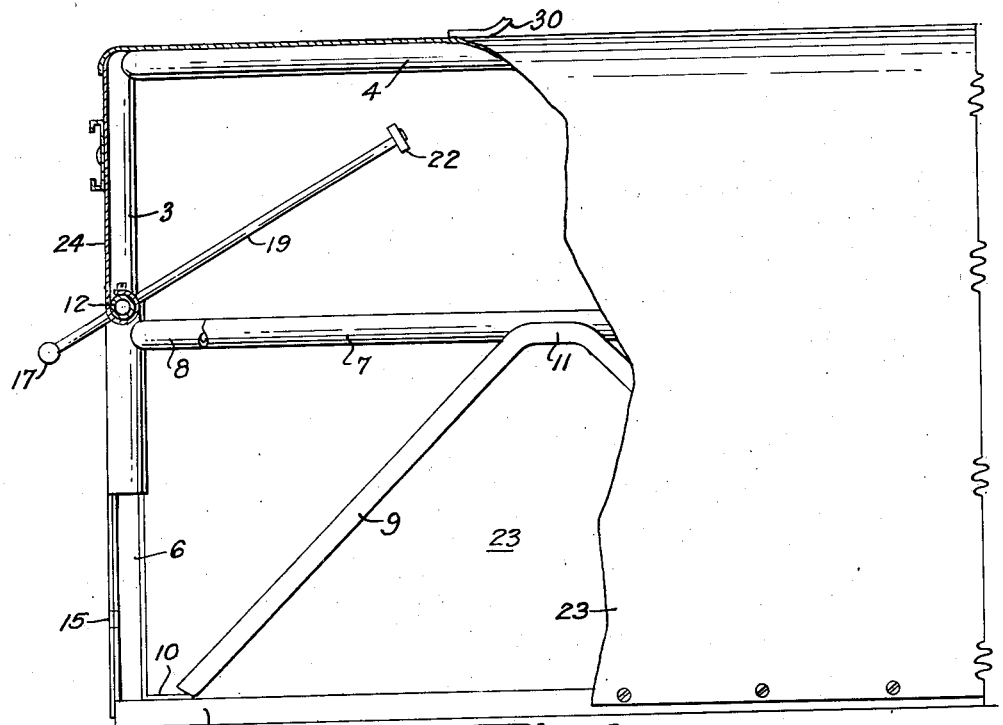
Fig. 1 is a side elevation of an animal shipping crate having a portion of the side wall and supporting frame broken away in vertical section, on the line I—I, Fig. 2, and constructed in accordance with this invention.

In detail the structure shown in Fig. 1, comprises the rectangular floor frame 1, preferably composed of aluminum angle bars surrounding the floor plate 2, attached to the under flanges of the surrounding frame 1.

The superstructure comprises the tubular front arch 3, and a similar rear arch, not shown. These front and rear arches are connected by the ridge pole 4 having its ends fitted to and secured to these arches, respectively. The upright portions such as 5, 6, of the arches have their lower ends secured to the floor frame at the four corners of the floor portion. The superstructure has a girt frame with the side bars such as 7, 8, having their ends fitted and secured to the uprights such as 5, 6. These side bars 7, 8, are stabilized by side braces such as 9, preferably of channel or angle bars having their ends fixed to the floor frame as at 10, and their center portions secured to the girt bars as at 11.

Figure 2:
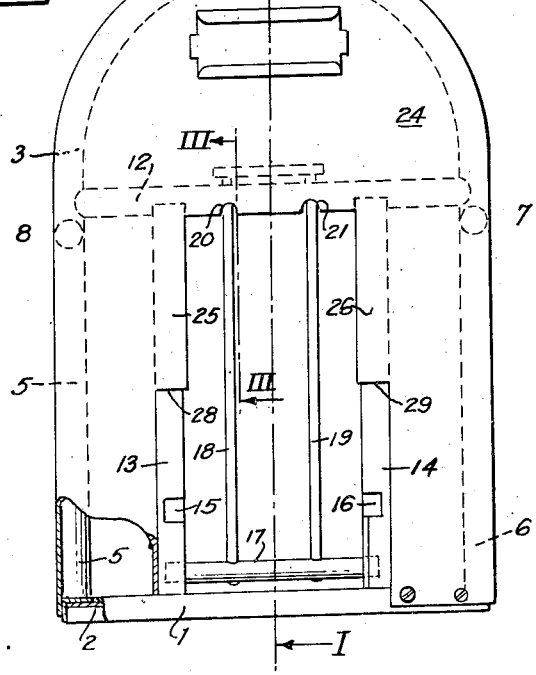
Fig. 2 is a front view of the same, with a portion of the front wall broken away in vertical section.

Referring to Fig. 2, the gate frame comprises the tubular pivot tube 12, with its ends fixed to the uprights 5, 6, respectively, and forming the top of the gateway frame, having the channel side posts 13, 14, secured to the floor frame at the bottom and to the underside of the pivot tube 12 at the top, respectively. These posts have the notches 15, 16 in their front flanges.

Figure 3:
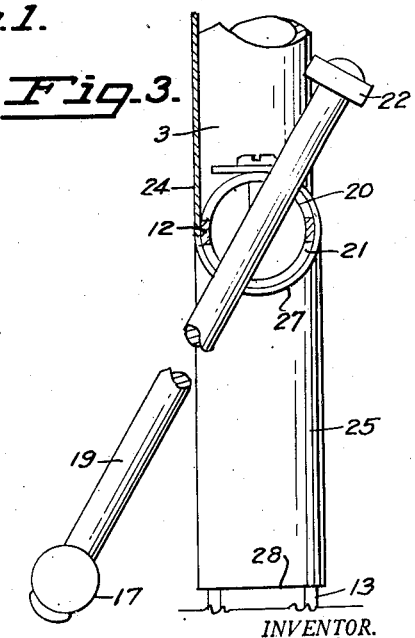
Fig. 3 is an enlarged detail in vertical section on the line III—III, Fig. 2, of the gate pivot assembly.

The gate comprises the bottom cross bar 17 having the ends of the grille bars 18, 19 fixed therein and extending vertically through the slots 20, 21 in the transverse pivot tube 12, and are joined across their top ends by the bar 22. The cross bar 17 slides freely in the channels of the side posts 13, 14, and the grill bars slide freely and swing backward and forward within the slots 20, 21 in the pivot tube 12. The cross bar 17 may be withdrawn from the channel posts through the notches 15, 16. This permits the full opening of the gateway, by swinging the gate assembly outwardly at the front and inwardly at an angle above the pivot tube 12, as in Figs. 1 and 3.

The whole superstructure is enclosed within the sheathing of sheet aluminum, wire netting or other suitable material 23, according to climatic and other conditions. The front plate 24 covering the front end of the superstructure has an opening therein with its lateral and top portions 25, 26, 27, curled around and secured to the pivot tube 12, and the side posts 13, 14, surrounding the gateway down to the level 28, 29. At this level the lateral portions 25, 26 are folded behind the posts 13, 14. The level 28—29 acts as a stop to prevent the lifting of the cross bar 17 above that point, when this bar is within the channels of the side posts 13, 14. The inturned sheathing at 27, reinforces the pivot tube 12. The handle 30 is attached to the top of the superstructure.

The invention operates substantially as follows: With the cross bar 17 in the position shown in Figure 1, the occupant animal walks into the crate. The cross bar 17 is then pulled outwardly and downwardly and entered through the notches 15, 16, the bars 18, 19, sliding through the tube 12. This closes the gateway.

When the cross bar 17 is slid upward within the channel sides 13, 14 it is stopped by the stops 28, 29, which prevents the egress of the occupant, while a food or water container is being introduced into the crate. The gateway is opened by lifting the cross bar 17 upward and outward through the notches 15, 16, and swinging it into the position shown in Fig. 1.

Having fully described this invention and its mode of operation what we claim and desire to secure by Letters Patent is:

1. A portable crate comprising an enclosed body with a gateway therethrough; posts defining the sides of said gateway and having longitudinal guide channels with front notches therein; stops on said posts above said notches; a pivot tube extending across the top of said gateway above said side posts; and a gate having a cross bar guided in said channels and having grille bars thereon pivotally slidable in slots in said pivot tube.

2. A portable crate comprising an enclosed body with a gateway therethrough; posts defining the sides of said gateway and having longitudinal guide channels with front notches therein; a pivot tube extending across the top of said gateway above said posts; a gate having a cross bar guided in said channels and having grille bars thereon pivotally slidable in slots in said pivot tube; and a sheathing plate covering the front end of said body and having a portion bent around said posts and forming stops for said cross bar above said notches.

3. A portable crate having a floor with a tubular frame forming a superstructure above said floor and having posts defining the sides of a gateway in said frame and having guide channels with front notches therein; a pivot tube extending across the top of said gateway above said posts; a gate having a cross bar guided in said channels and having grille bars thereon pivotally slidable in slots in said pivot tube; and a sheathing covering said superstructure and having an opening registering with said gateway and having the marginal portions of said opening bent around said pivot tube and around said posts and forming stops across said channels above said notches.

RALPH R. WILLIS.
LOUIS L. BAYERS.

No references cited.